US006325957B1

(12) United States Patent
Kumacheva et al.

(10) Patent No.: US 6,325,957 B1
(45) Date of Patent: Dec. 4, 2001

(54) METHOD OF PRODUCING THREE DIMENSIONAL ASSEMBLY OF PARTICLES IN ORDERED ARRAYS

(75) Inventors: Eugenia Kumacheva; Olga Kalinina, both of Toronto (CA)

(73) Assignee: The Governing Council of The University of Toronto, Toronto (CA)

( * ) Notice: Subject to any disclaimer, the term of this patent is extended or adjusted under 35 U.S.C. 154(b) by 0 days.

(21) Appl. No.: 09/450,781

(22) Filed: Nov. 30, 1999

Related U.S. Application Data
(60) Provisional application No. 60/137,500, filed on Jun. 4, 1999.

(51) Int. Cl.[7] .................................................. B28B 1/087
(52) U.S. Cl. .............................. 264/71; 210/748; 264/72; 264/235; 264/346
(58) Field of Search ................................ 264/1.1, 1.7, 2.6, 264/69, 71, 72, 437, 438, 442, 105, 235, 319, 346; 210/748

(56) References Cited

U.S. PATENT DOCUMENTS

| | | | |
|---|---|---|---|
| 5,085,783 | * 2/1992 | Feke et al. ............................ | 210/748 |
| 5,147,562 | * 9/1992 | Heyman ................................ | 210/748 |
| 5,225,089 | 7/1993 | Benes et al. . | |
| 5,540,951 | 7/1996 | Nagayama et al. . | |
| 5,831,166 | * 11/1998 | Kozuka et al. ....................... | 210/748 |
| 5,902,489 | * 5/1999 | Yasuda et al. ........................ | 210/748 |
| 5,952,131 | 9/1999 | Kumacheva et al. . | |

FOREIGN PATENT DOCUMENTS 0 773 055 A2   5/1997   (EP) .

OTHER PUBLICATIONS

Two–and Three–Dimensionial Crystallization of Polymeric Microspheres by Micromolding in Capillaries; Enoch Kim, Younan Xia and George M. Whitesides, Adv. Mater 1996 8 No. 3; pp. 245–247.

Crystallization of non–Brownian Spheres under Horizontal Shaking; O. Pouliquen, M. Nicolas and P.D. Weidman, Nov. 10, 1997 The American Physical Society, vol. 79, No. 19, pp. 3640–3643.

Template–directed colloidal crystallization; Alfons van Blaaderen, Rene Ruel & Pierre Wiltzius, Nature/vol. 385/23 Jan. 1997 pp. 321–324.

Settling Suspensions of Colloidal Silica: Observations and X–Ray Measurements; K. E. Davis, W. B. Russel and W. J. Glantschnig; J. Chem. Soc, Faraday Trans 1991 87(3) pp. 411–424.

(List continued on next page.)

Primary Examiner—Mathieu D. Vargot
(74) Attorney, Agent, or Firm—Lynn C. Schumacher; Hill & Schumacher

(57) ABSTRACT

A method of producing three dimensional ordered arrays of particles. The method may be used for the preparation of nanocomposite materials with highly periodic structures. More particularly the invention provides a method of producing three dimensional arrays based on applying a controlled oscillatory motion to settling dispersions of colloid particles. The controlled oscillatory motion is characterized by $G=A\omega^2/g$, wherein g is the gravitational constant, A is the displacement and $\omega$ is angular frequency. G is maintained in the desired range by varying values of A within an effective range of displacements and $\upsilon$ within an effective range of frequencies.

29 Claims, 7 Drawing Sheets

OTHER PUBLICATIONS

Communication: The use of core–shell latex morphology; E. Kumacheva, O. Kalina and L. Lilge, Adv. Mater 1999, 11, pp. 231–234.

Inhibited Spontaneous Emission in Solid–State Physics and Electronics; Eli Yablonovitch, Physical Review Letters, vol. 58, No. 20, May 18 1997, pp. 2059–2062.

Structure of Solidifed Colloidal Array Laser Filters Studied by Cryogenic Transmission Electron Microscope; Eduardo A. Kamenetzky, Lino G. Magliocco and Hans P. Panzer; Science vol. 263, Jan. 14, 1994 pp. 207–210.

Two–dimensional crystallization; N.D. Denkov, O. D. Velev, P. A. Kralchevsky and I.B. Ivano, Faculty of Chemistry, University of Sofia, 1126 Sofia, Bulgaria; H. Yoshimura, K. Nagayama, Protein Array Project, Erato, JRDC 18–1 Higashiarai, Tsukuba 305 Japan; Scientific Correspondence, Nature, vol. 361 Jan. 7, 1993, p. 26.

Carbon Structures with Three–Dimensional Periodicity at Optical Wavelengths; Anvar A. Zakhidov, Ray H. Baughman, Zafar Iqbal, Changxing Cui, Ilyas Khayrullin, Socrates O. Dantas, Jordi Marti, Victor G. Ralchenko, Science, vol. 282, Oct. 20, 1998, pp. 897–901.

Ultrasonically facilitated two–dimensional crystallization of colloid particles; Minoru sasaki and Kazuhiro Hane, J. Appl. Phys. 80 (9) Nov. 1, 1996 pp. 5427–5431.

Ordering and structure at interfaces of colloidal dispersions under flow; Stuart M. Clarke and Adrian R. Rennie; Faraday Discuss. 1996, 104 pp. 49–63.

3D Long–Range Ordering in an $SiO_2$ Submicrometer–Sphere Sintered Superstructure; R.I Mayoral, J, Requena, J. S. Moya, c. Lopez, A. Cintas, H. Miguez, F. Meseguer, L. Vazquez, M. Holgado and A. Blanco, Adv. Mater 1997, 9, No. 3 pp. 257–260.

* cited by examiner

Diffraction intensity plotted for samples obtained at different acceleration ratios

METHOD OF PRODUCING THREE DIMENSIONAL ASSEMBLY OF PARTICLES IN ORDERED ARRAYS

CROSS REFERENCE TO RELATED US PATENT APPLICATION

This patent application relates to United States Provisional patent application, Ser. No. 60/137,500, filed on Jun. 4, 1999, entitled METHOD OF PRODUCING THREE DIIMENSIONAL ASSEMBLY OF PARTICLES IN ORDERED ARRAYS.

FIELD OF THE INVENTION

The present invention relates to a method of producing three dimensional crystalline assemblies of particles that can be used for the preparation of nanocomposite materials with highly periodic structures. More particularly the invention relates to producing ordered three dimensional arrays from dispersions of colloid particles.

BACKGROUND OF THE INVENTION

Ordered nanocomposite materials hold great promise as optical and photoelectronic devices, sensors, and catalyst supports, see for example Kamenetzky, E. A.; Mangliocco, L. G.; Pinzer, H. P.; *Science* 1994, 263, 207; Yablonovitch, E.; *Phys. Rev. Lett.* 1987, 58, 2059; S. John, ibid., 2486. One previously demonstrated approach to producing functionalized polymer-based nanocomposite materials in ordered arrays is disclosed in Kumacheva, E.; Kalinina, O.; Lilge, L.; *Adv. Mat.* 1999, 11, 231.

A critical stage in this approach is the assembly of colloid particles in three dimensional crystalline arrays. A reduction in particle dimensions and a substantial dilution of the latex dispersions favor ordering of latex microspheres upon their sedimentation. Similar effects were observed in settling dispersions of silica particles as disclosed in Davis, K. E.; Russel, W. B.; Glantschnig, W. J.; *J. Chem. Soc. Faraday Trans.* 1991, 87, page 411. A serious drawback of the colloid crystal growth from settling dilute dispersions is associated with long sedimentation times that may range from several days to few months, see for example Mayoral, R.; J. Requena, J.; Moya, J. S.; Lopez, C.; Cintas, A.; Miguez, H.; Moseguer, F.; Vazquez, L.; Holdago, M.; Blanco, A. *Adv. Mater.* 1997, 9, 257; and Zahidov et al.; *Science* 1998, 282, 897. As disclosed in Kumacheva, E.; Kalinina, O.; Lilge; L., *Adv. Mat.* 1999, 11, 231, in order to obtain nanocomposite films with the thickness varying from 2 to 10 mm, the sedimentation was carried out for the time periods ranging from few days to few weeks. Any forced concentration of the latex dispersions, such as centrifugation, vacuum filtration, or rapid solvent evaporation, induce distortions in particle arrangement.

Crystallization of microspheres in steady shear conditions has long been known, however, this method is usually used for producing two-dimensional particle arrays or small-scale three-dimensional systems as disclosed in Denkov, N. D.; Velev, O. D.; Kralchevsky, P. A.; Ivanov, H.; Yoshimura, H.; Nagayama, K.; *Nature* 1993, 361, 26; and Kim, E.; Xia, Y.; Whitesides, G. M.; *Adv. Mat.* 1996, 8, 245. Utrasonication of settling dispersions enhances particle packing, see Krieger, I. M.; Hiltner, P. A.; in *Polymer Colloids*, Ed. R. M. Fitch, Plenum Press, London, 1971, p. 63, but no information exists to what extent variation in frequency or displacement influences the organization of microspheres.

Application of lateral oscillatory motion to a container of hard glass beads resulted in crystalline packing of the beads, as disclosed in Pouliquen, O.; Nicolas, M.; and Wiedman, P. D.; *Crystallization of Non-Brownian Spheres under Horizontal Shaking*, Physical Review Letters, Vol. 79, No. 19, p. 3640–3643.

It is very desirable to have simple and efficient methods for preparing structures comprised of nanoparticles, such as colloidal particles, that are ordered on a macroscopic scale, including thin film and particularly three dimensional periodic arrays. Therefore, there is a need for a method of rapidly and economically producing three dimensional assemblies of particles in ordered arrays.

SUMMARY OF THE INVENTION

It is an object of the present invention to provide a method of producing three dimensional assemblies of particles in ordered arrays.

The present invention relates to a method of producing ordered three dimensional arrays based on applying a controlled oscillatory motion to dispersions of colloid particles.

Embodiments of the present invention, include:

reducing or overcoming deficiencies in the prior art processes, by providing processes with improved efficiency and improved operational economies.

The present invention provides a method of producing three dimensional assembly of particles in ordered arrays, comprising:

providing a dispersion of colloidal particles in a liquid;

inducing settling of said dispersion of colloidal particles;

applying an effective oscillatory motion to said settling dispersion of colloidal particles to form a three dimensional array of particles, the oscillatory motion having a displacement A in an effective range and a frequency $\upsilon$ in an effective range; and removing the three dimensional array of particles from said liquid.

In another aspect of the invention there is provided a method of producing three dimensional assembly of particles in ordered arrays, comprising:

providing a dispersion of colloidal particles in a liquid contained in an enclosure having a bottom;

inducing settling of said particles;

applying an effective oscillatory motion to said settling dispersion of colloidal particles to form a three dimensional array of particles, the oscillatory motion having a displacement A in an effective range and a frequency $\upsilon$ in an effective range; and simultaneously removing liquid through the bottom of the enclosure while oscillatory motion is applied to the enclosure; and removing the three dimensional array of particles from said liquid.

BRIEF DESCRIPTION OF THE DRAWINGS

The method of producing three dimensional assemblies of particles in ordered arrays forming the present invention, will now be described, by way of example only, reference being had to the accompanying drawings, in which:

FIG. 2a, G=0; FIG. 2b, G=16.4; FIG. 2c, G=18.6; FIG. 2d, G=34.5, with the images being taken at a distance 10 μm from the interface of the sample with the membrane and the scale bar is 2 μm;

FIG. 4a, z=0; FIG. 4b, z=40 μm; FIG. 4c, z=80 μm; FIG. 4d, z=100 μm, the scale bar is 2 μm.

DETAILED DESCRIPTION OF THE INVENTION

Figure 1A:
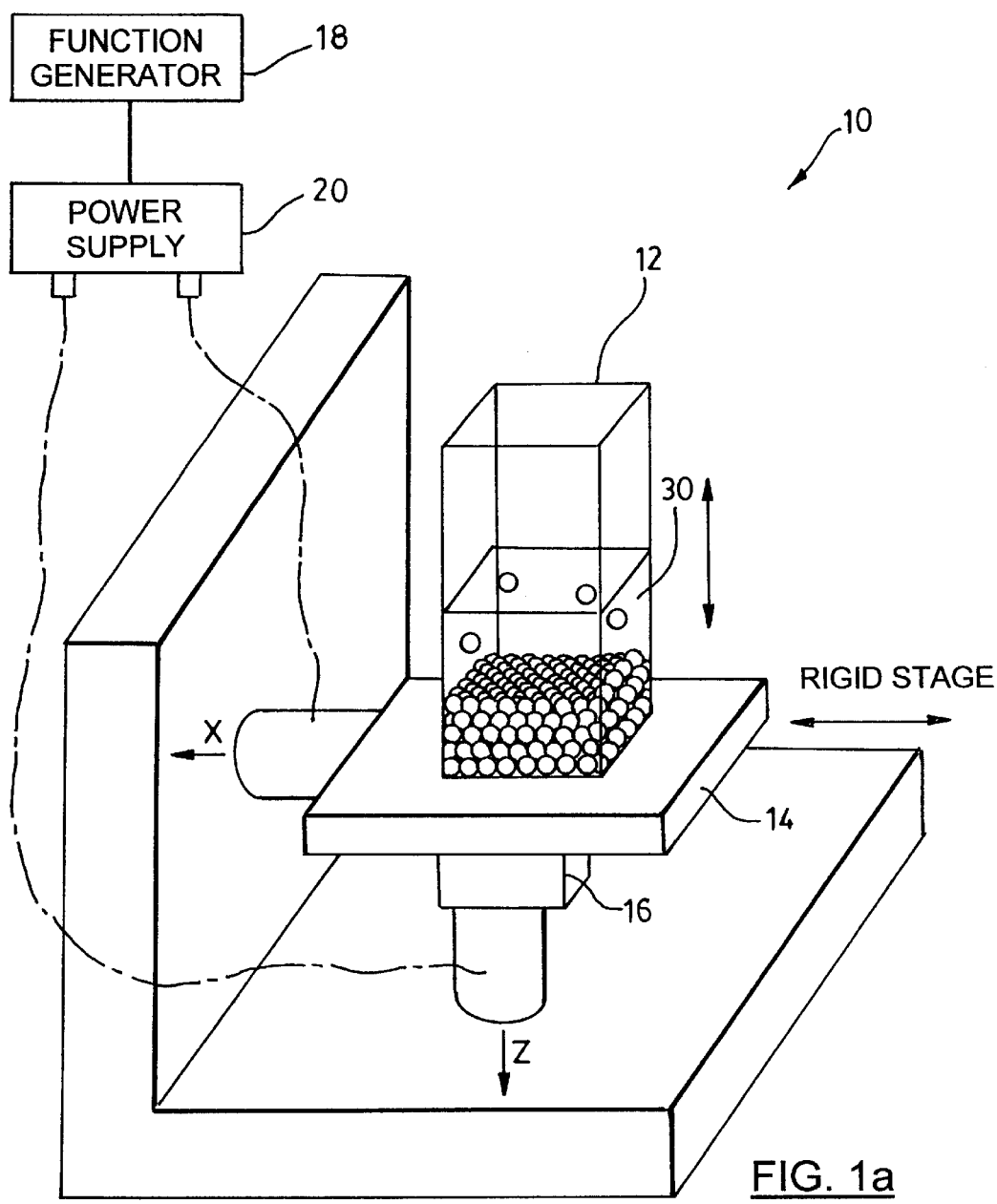
FIG. 1*a* is a perspective view of a device used to grow three dimensional ordered arrays in accordance with the present invention.

In embodiments the present invention provides:

a method of producing three dimensional assembly of particles in ordered arrays, comprising:

providing a dispersion of particles in a liquid, the dispersion having a concentration in an effective range;

inducing settling of the particles;

applying an effective oscillatory motion to the settling dispersion of particles to form a three dimensional array of particles; and removing the three dimensional array of particles from the liquid.

The aforementioned settling may be achieved by gravitational sedimentation, electrophoretically-induced motion or liquid evaporation. For particles lighter than liquid settling is equivalent to creaming.

The present invention describes a new process for producing three dimensional crystalline arrays of nanocomposite colloid particles. In its broadest aspect, the process comprises applying controlled oscillatory motion (or vibrations) to the colloidal dispersion with the oscillatory motion characterized by an amplitude falling in an effective range and a frequency in an effective range to give highly periodic structures which can be produced with a high degree of ordering much more quickly than existing methods. The controlled oscillatory motion may be applied in the vertical direction parallel to the direction the colloidal particles drop during settling. The controlled oscillatory motion may also be applied laterally to the colloidal dispersion, namely in the plane perpendicular to the direction the colloidal particles drop which is substantially parallel to the plane defined by the growing array of settled particles.

A more preferred embodiment of the method disclosed herein is based on applying controlled oscillatory motion to the settling colloidal dispersion with simultaneously removal of the liquid from the container holding the dispersion thereby further aiding the setting dispersion to crystallize into a highly ordered three dimensional array. This preferred embodiment is particularly useful for facilitating contact between colloidal particles during the settling process in colloidal dispersions with high concentrations. Removal of the liquid can be achieved by using a semipermeable membrane as the bottom of the container that permits passage of the liquid but not the colloidal particles.

The controlled oscillatory motion can take different forms. It may comprise only one component, for example along x, y, or z-directions only or it may include any two components, for example a direction including both x and y components, or in a direction with x and z components, or it may include a direction having components in all three directions. Oscillatory vibrations applied along two or three directions may be in-phase with respect to each other, or alternatively, shifted in phase. Oscillatory vibrations applied along two or three directions may have the same shape of the signal, for example, they may all be sinusoidal or have different shapes in different directions, for example, sinusoidal along the x-direction and stepwise along y-direction.

The controlled oscillatory motion in the lateral direction can take on different forms. If the lateral direction is considered to be defined as the x-y plane, the oscillatory motion may comprise only one component in any direction in the plane. Alternatively it could comprise a vibrational component in the x-direction and a component in the y-direction to give a mixture.

As used herein, the phrases "colloid" or "colloidal particles" refer to particles, not necessarily spherical, having mean diameters over a range from a few nanometers to tens of microns. The colloidal particles used to form the arrays may comprise either organic, inorganic or both organic and inorganic constituents having magnetic properties, optical sensitivity, dielectric properties, electrically conductive properties, semiconducting properties, or any combination of these properties.

The present method may be used without simultaneous removal of liquid for dispersions in which the colloidal particle density is greater than that of the liquid. Typical concentration of particles in such dispersions are of the order from 0.5 to 20 weight %. In this case, controlled vibration leads to substantial improvement in particle ordering.

In the case where the density of the colloidal particles is close to the density of the liquid in which the dispersion is formed a very significant and surprising advantage of the present method is obtained by combining liquid removal from the dispersion with the controlled oscillatory motion. This method is advantageous for several reasons. First, it accelerates the process of formation of a close-packed structure from colloidal particles whose density $\rho_c$ is close to that of the dispersion liquid $\rho_l$ because the rate of particle settling with the simultaneous removal of liquid is higher than the rate of particle sedimentation under gravity. Second, more concentrated dispersions can be used, namely those with a solid content up to approximately 40 weight % for which particle ordering is problematic because of coagulation and flocculation. Third, forced removal of liquid facilitates formation of close-packed ordered structures from colloid particles that have a density $\rho_c$ lower than the dispersion liquid $\rho_l$.

Figure 1B:
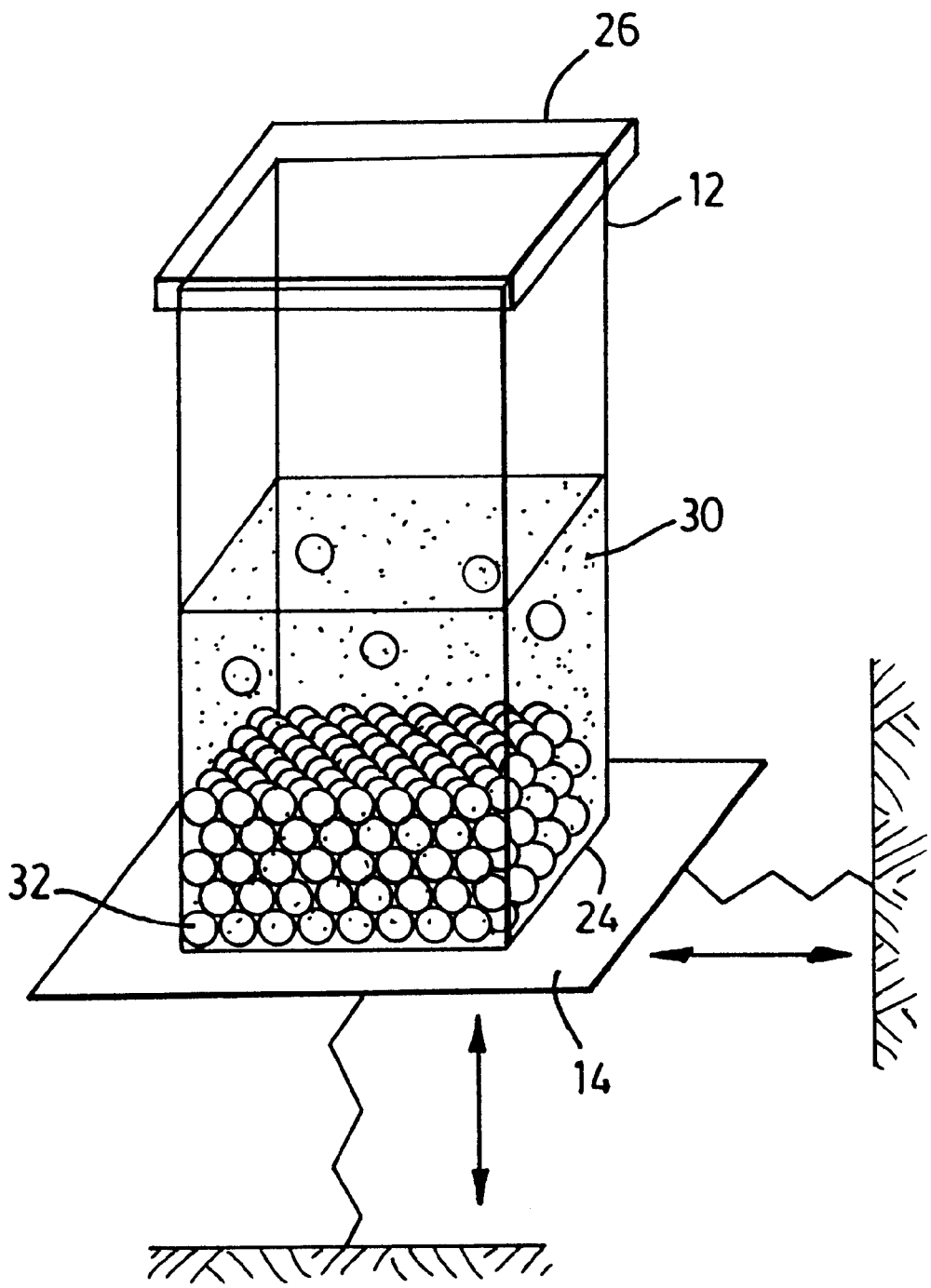
FIG. 1*b* is a perspective view of a portion of the device of FIG. 1*a*.

A device for producing the ordered three dimensional arrays is shown at 10 in FIG. 1a. A container 12 is mounted on a rigid stage 14 that is connected to a drive mechanism 16 for subjecting container 12 to oscillatory motion. Drive mechanism 16 includes a drive mechanism for driving the rigid stage 14 in the lateral direction (horizontal movement in x-y plane) and z-direction (vertical movement). The drive mechanism 16 is connected to a power supply 20 and function generator 18 for supplying the desired frequency for imparting the oscillatory shear to the container 12. Referring to FIG. 1b, the bottom of container 12 is replaced by a semipermeable membrane 24 and a cap 26 is placed on top of container 12 to suppress evaporation from the container 12 containing the colloidal dispersion 30 from which the ordered arrays 32 are to be produced. The process of liquid removal may be enhanced by applying a small positive pressure to the dispersion 30 within the container 12.

The relative acceleration of the applied vibration is given by $G = A\omega^2/g$ where A is the displacement or amplitude of the vibration imparted to the dispersion, which in turn drives the container 12 holding the dispersion 30 in either vertical or lateral direction, $\omega$ is the angular frequency, and g is the gravitational acceleration constant. The angular frequency $\omega = 2\pi\upsilon$, wherein $\upsilon$ is frequency and is preferably in a range from about 100 to an upper frequency of about 10,000 Hz. The displacement A (vertical or horizontal) is preferably in a range from about $5 \times 10^{-6}$ cm to about $25 \times 10^{-3}$ cm.

The lowest limit in the amplitude of the displacement is about five to ten times the mean diameter of the particles comprising the dispersion. Using displacements exceeding approximately fifty times the particle diameters are prone to inducing disordering in the particle sediment. Thus to order particles with small diameters displacement with small amplitudes should be applied to the system. It can be anticipated from the dependence of the Brownian motion on the size of particles that the optimum frequency of oscillatory motion will be higher for small particles and lower for bigger particles. The method of the present invention may be used with colloidal particles having a diameter in a range from about 10 nm to about $3 \times 10^{-3}$ cm. Once the preferred values for range of G have been determined for a particular colloidal dispersion, there is flexibility in choosing the values of displacement A or frequency $\omega$ for obtaining the preferred value of G subject to the above noted constraints on these parameters. Therefore for a particular value of G, increasing A would be accompanied by a decrease of $\omega$ since $G = A\omega^2/g$.

Once the three dimensional array has been grown it is removed from the liquid and separated from the support on which it was grown, the membrane 24 in the case where simultaneous liquid removal is used. Depending on the type of colloidal particles used, the array may be processed as required, for example, sintered, infiltrated with solutions of organic or inorganic materials, used as templates for vapor deposition of organic or inorganic materials, or annealed at elevated temperatures to form nanocomposite materials. Very surprisingly, highly ordered nanocomposite arrays of several millimeters in thickness have been grown in several hours which is a significant advance over known methods.

EXAMPLE

In one non-limiting exemplary example of the invention colloidal particles comprising composite core-shell latex microspheres with fluorescent tags in the cores were used because the bulk structure of three dimensional materials formed from them could be readily characterized using non-destructive confocal fluorescent microscopy.

The synthesis of the core-shell latex particles is described in Kumacheva, E.; Kalinina, O.; Lilge, L.; *Adv. Mat.* 1999, 11, 231. The core-forming polymer was cross-linked poly (methyl methacrylate) copolymerized with the fluorescent dye-labeled comonomer 4-amino-7-nitrobenzo-2-oxa-1,3-diazol-methyl methacrylate (NBD-MMA) and the shell-forming polymer was a copolymer of butyl- and methyl methacrylate.

After the latex particles were synthesized, the dispersion 30 with the solid content of ca. 20 weight % was transferred to container 12 in FIG. 1a with semipermeable membrane 24 (HT 450 with the pore size 0.45 pm obtained from Gelman Sciences). The filtration of water was followed by its evaporation from the surface of the membrane 24. The container 12 was mounted onto the rigid stage, and a triangular lateral or vertical oscillatory motion with suitable frequency and amplitude was applied to the stage 14.

Sediments with the thickness of ca. 3 mm were obtained for the time period of ca. 10 h. After particles were settled and dried, the sediment was annealed at 110° C. to form a polymeric film. The extent of ordering of particles was studied by examining the structure of the nanocomposite array. However, qualitatively crystallization of the settling core-shell particles can be identified from the iridescence of latex sediments using confocal fluorescence. Annealing of such systems produced nanocomposite materials with ordered structures.

Latex dimensions were examined using Hitachi S-570 Scanning Electron Microscope at an accelerating voltage of 15 kV. The morphology of the polymer block material was studied on Bio-Rad MRC 600 Confocal Fluorescent Microscope and the 488-nm line of the Ar-ion laser was used for the excitation of the chromophore in the core particles. Vertical and lateral resolutions were about 0.7 and 0.3 $\mu$m, respectively. SEM and LCFM images were analyzed with the software Image Tools (University of Texax Health Sciences Centre).

Figure 2A:
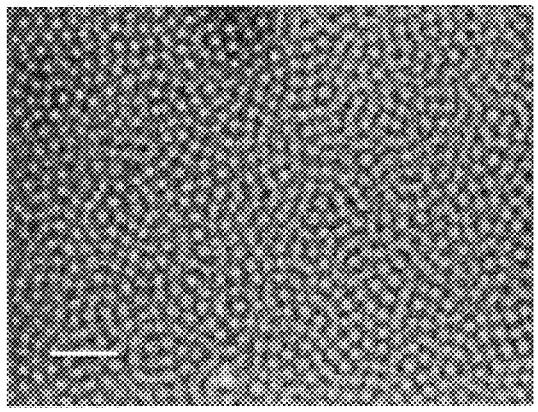
FIGS. 2*a*, 2*b*, 2*c* and 2*d* are confocal fluorescent microscopy micrographs showing typical structures of the nanocomposite material obtained under lateral vibration from the core-shell particles with the core diameter of 350 nm and the shell thickness of 90 nm for different values of acceleration G.
Figure 2B:
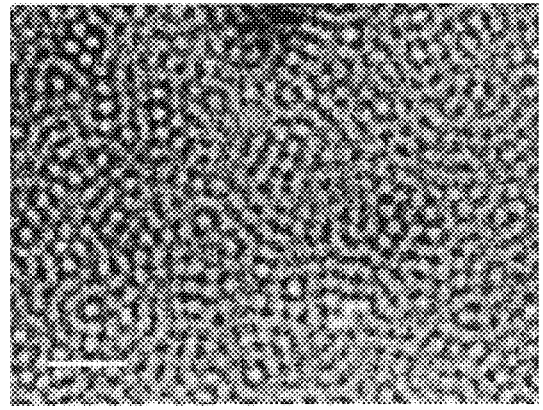
Figure 2C:
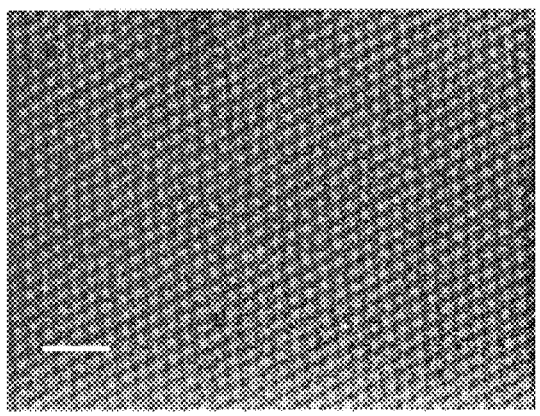
Figure 2D:
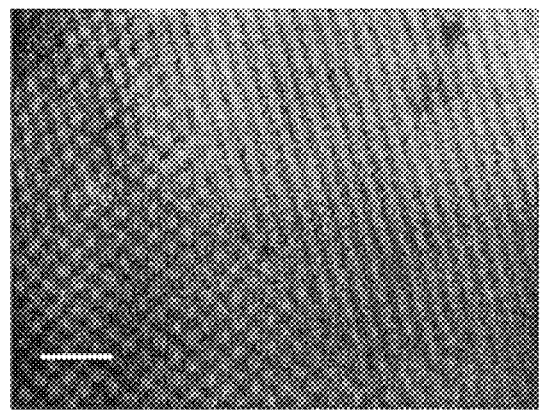

FIGS. 2a, 2b, 2c and 2d demonstrate the morphology of the nanocomposite materials obtained from latex dispersions to which horizontal (lateral) vibration with different accelerations was applied. The core-shell latex particles had a core diameter of 350 nm and the shell thickness of 90 nm. Fluorescent-labeled cores appear bright. All images are taken at the distance 10 $\mu$m from the interface of the sample with the membrane. The values for the acceleration G were: FIG. 2a: G=0; FIG. 2b: G=16.4; FIG. 2c: G=18.6; and FIG. 2d: G=34.5. For G≦17 typical particle organization was completely random and similar to that obtained in the control samples without vibration (see FIGS. 2a and 2b). A dramatic enhancement in particle ordering was achieved when G>17: the sediments gained iridescence, and the core particles in the nanocomposite material became organized in ordered arrays as shown in FIG. 2c. Polymer films obtained at G≧30 exhibited randomly stacked close-packed ordered domains with different orientations, see FIG. 2d.

Qualitatively similar influence of G on particle packing was observed when vertical vibration was applied to a fluid-like latex sediment.

Figure 3A:
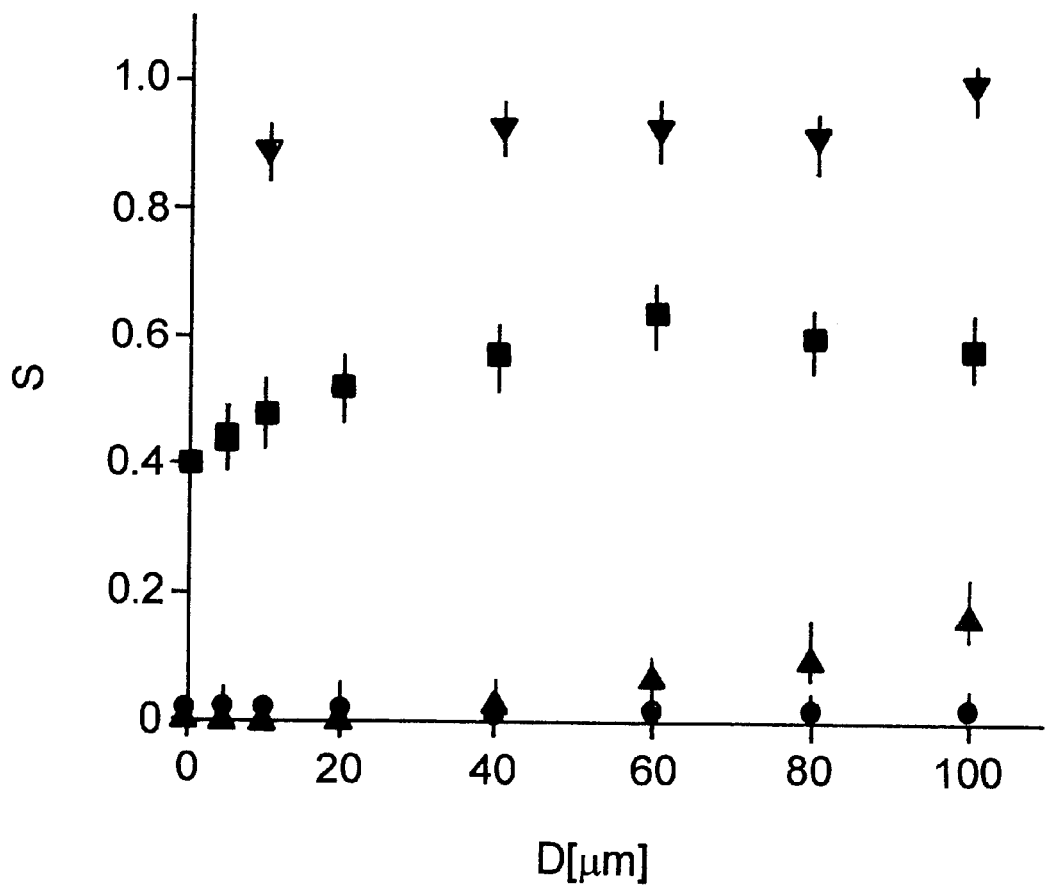
FIG. 3a is a plot showing the area fraction, S, of the largest close-packed domain ordered in a particular direction plotted as a function of the distance D of the two-dimensional slice from surface, for each experimental point 10 images captured at different spots of a particular plane were analyzed for several values of acceleration G for horizontal oscillatory motion applied to the dispersion, acceleration G: (●) 16.4; (▲) 17.5; (▼) 18.6; (■) 34.5.
Figure 3B:
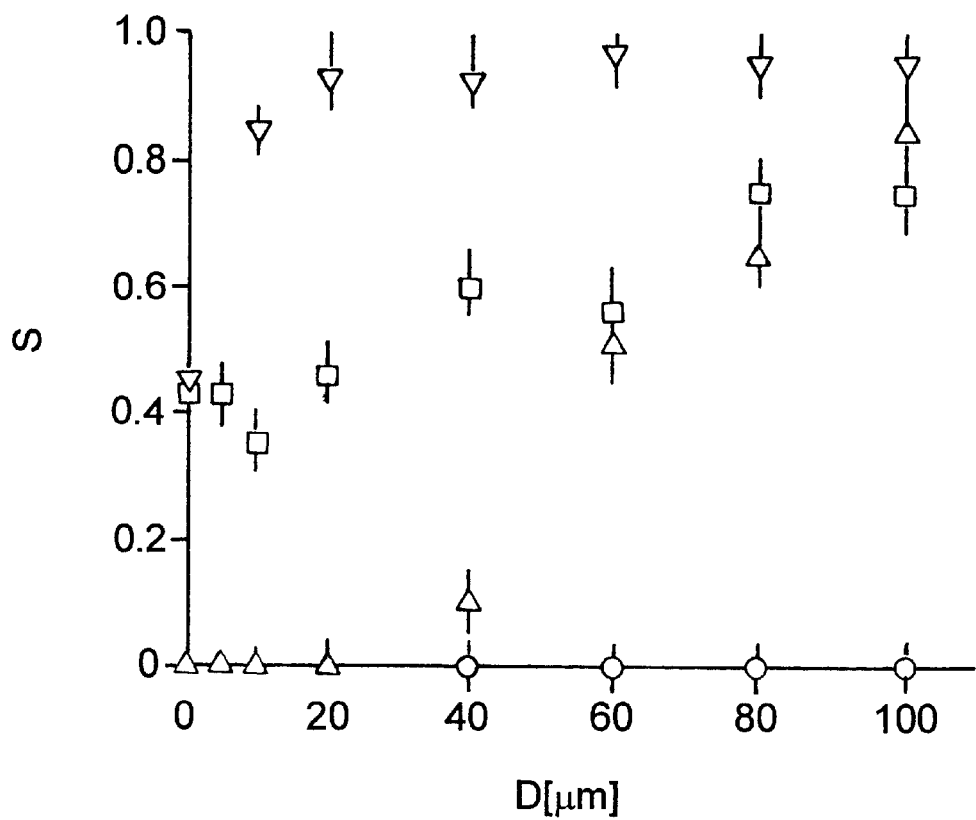
FIG. 3b is a plot showing the area fraction, S, of the largest close-packed domain ordered in a particular direction plotted as a function of the distance D of the two-dimensional slice from surface, for each experimental point 10 images captured at different spots of a particular plane were analyzed for several values of acceleration G for vertical oscillatory motion applied to the dispersion, acceleration G: (○) 17.0; (△) 21.2; (▽) 25; (□) 36.3.

In FIGS. 3a and 3b, the degree of ordering of the "core" particles is plotted as the area fraction, S, of the largest close-packed domain ordered in a particular direction plotted as a function of the distance of the two-dimensional slice from surface for different values of G. For each experimental point 10 images captured at different spots of a particular plane were analyzed. The plots in FIG. 3a correspond to different horizontal vibrations with acceleration G values of: (●) 16.4; (▲) 17.5; (▼) 18.6; (■) 34.5. The plots in FIG. 3b correspond to different vertical vibrations with acceleration values of: (○) 17.0; (Δ) 21.2; (∇) 25; (□) 36.3. A sharp enhancement in ordering is achieved when G exceeds ca. 18 and 25 for lateral and vertical vibration, respectively.

The effect of acceleration on organization of settling microbeads can be understood in terms of a balance between the rate of particle settling and the rate of oscillatory motion. The velocity of the oscillatory motion has to be sufficiently high to induce colloidal crystallization in a fluid-like sediment before particles become immobilized by friction forces and an increasing weight of the upper layers of microspheres. In contrast to particle sedimentation governed by their buoyant mass, as disclosed in Mayoral, R.; J. Requena, J.; Moya, J. S.; Lopez, C.; Cintas, A.; Miguez, H.; Moseguer, F.; Vazquez, L.; Holdago, M.; Blanco, A.; Adv. Mater. 1997, 9, 257; and Zahidov et al. Science 1998, 282, 897, in the method disclosed herein the rate of latex settling was determined by the flow of water through the membrane. In this configuration, a very surprising result was that more concentrated dispersions could be used to obtain ordered particle sediments within shorter time periods. The average rate of the flow of a fluid was 0.3 μm/s that led to sedimentation rate of ca. $0.8 \times 10^{12}$ particles/$M^2$ S. For comparison, the average rate of particle sedimentation without filtration was ca. 0.0045 μm/s that is close to the value 0.004 μm/s obtained from the Stokes' drag law, see Probstein, R. F.; Physicochemical Hydrodynamics: an introduction, Butterworth. The optimum shear velocity measured by monitoring the displacement of the wall of the chamber was ~$3.5 \times 10^4$ μm/s. However, strictly speaking, the displacement of the latex particles in a fluid-like sediment may be smaller than the value for the wall of the chamber. Higher velocities of oscillatory motion presumably induced fluctuations in the lower, already packed layers of the sediment.

Exemplary studies carried out on several latex dispersions showed that the optimum ratio of the rate of particle sedimentation to the rate of oscillatory motion is determined by the particle size and charge, and the concentration of the latex dispersion, i.e. for each dispersion a "resonance" acceleration existed that provided ordered particle packing.

The internal organization of microspheres in 3D composite films enhanced with the remoteness from the interface adjacent to the membrane. FIGS. 4a, 4b, 4c and 4d are confocal fluorescent microscopy micrographs showing the change in the structure of the nanocomposite polymer obtained under vertical oscillatory shear at acceleration G=21.2 as a function of the distance from the surface adjacent to the membrane. The distance from the surfaces in FIG. 4a: z=0; FIG. 4b: z=40 μm; FIG. 4c: z=80 μm; and FIG. 4d: z=100 μm. The scale bar is 2 μm for each of the micrographs.

Figure 4A:
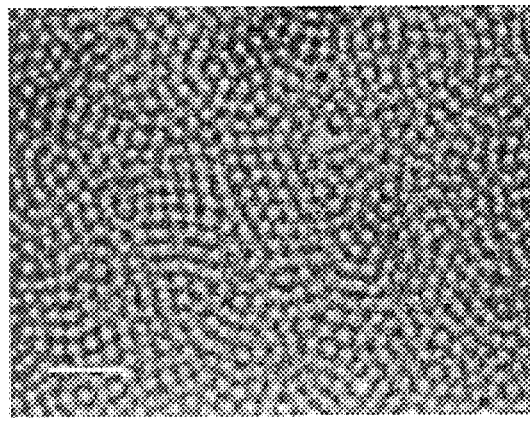
FIGS. 4a, 4b, 4c and 4d are confocal fluorescent microscopy micrographs showing change in the structure of the nanocomposite polymer obtained under controlled vertical oscillatory motion at acceleration G=21.2 as a function of the distance from the surface adjacent to the membrane for the following distances z from the surface.
Figure 4B:
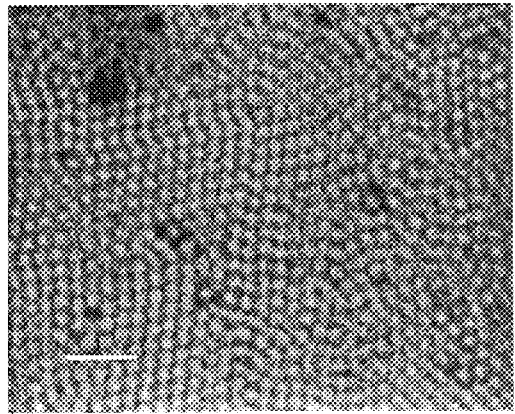
Figure 4C:
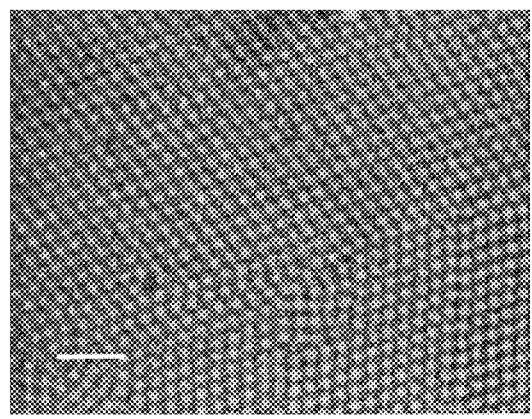

At the very interface the structure of the material shown in FIG. 4a was completely disordered. This feature was observed in the composite films obtained with and without vibration and could be anticipated because of the rough surface of the membrane.

Figure 4D:
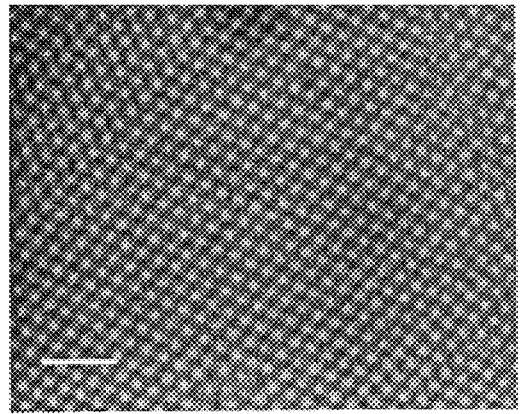

FIGS. 4b and 4c represent an enhanced particle organization, i.e., a stacking of close-packed ordered domains in two-dimensional slices located at the distance of 40 and 80 μm from the surface, respectively. At the depth 100 μm, the structure of the material exhibited a perfect order over 200 μm$^2$ that exceeded the field of view (FIG. 4d).

The dependence of the degree of ordering versus the distance from the interface is demonstrated in FIGS. 3a and 3b for systems obtained under lateral and vertical vibration. Vertical vibrations lead to a somewhat stronger tendency to "healing" of the structure, nevertheless, for insufficient values of acceleration the area fraction of the perfectly ordered domains was lower than that obtained at the optimum value of G.

This finding indicates that the organization of particles into ordered three dimensional assemblies under controlled oscillatory motion applied to settling dispersions of colloidal particles is an intrinsic feature of the system that is governed by particle interactions (in contrast to crystallization from settling dispersions driven by colloidal epitaxy, see Van Blaaderen, A.; Ruel, R.; Wiltzius, P.; Nature 1997, 385, 321). Strictly speaking, the larger the sample the weaker is the effect of the rough walls and the more ordered a structure of the nanocomposite material can be obtained.

Figure 5:
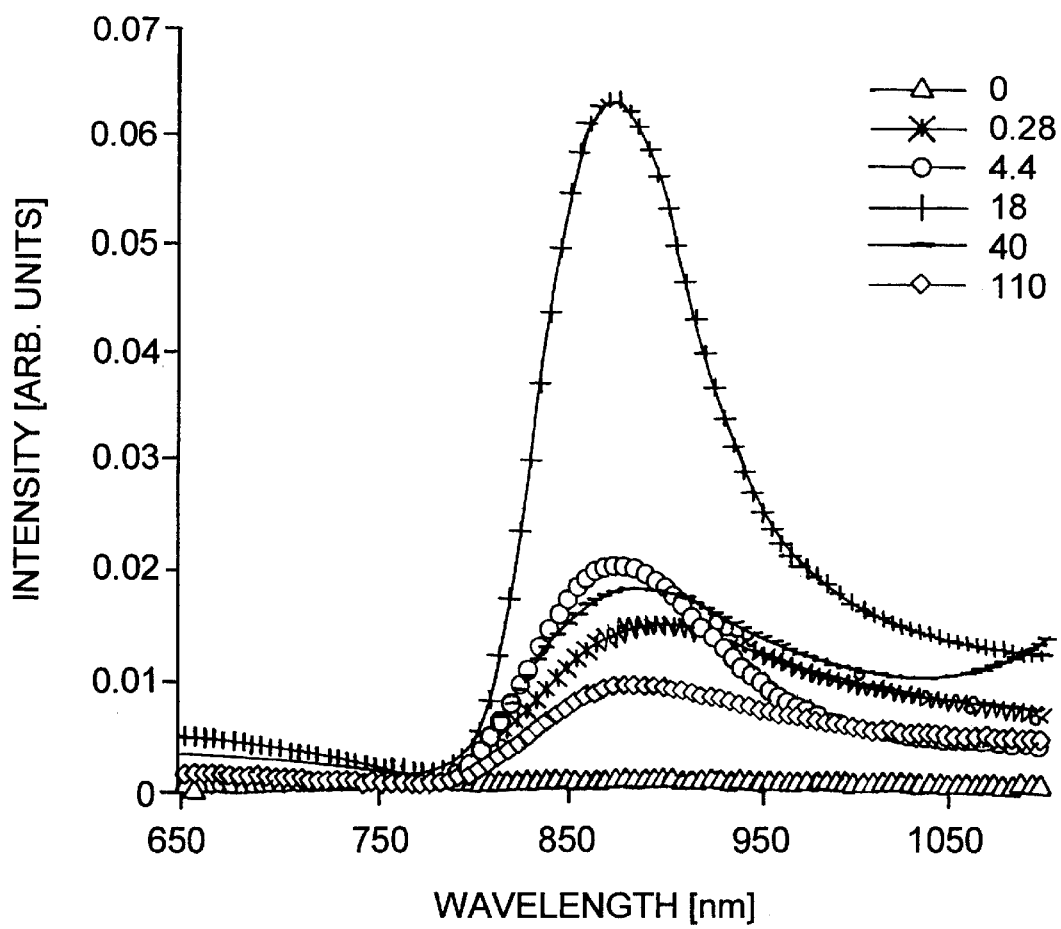
FIG. 5 shows optical diffraction spectra measured in reflection mode of several arrays of colloidal particles grown in accordance with the method of the present invention obtained at different acceleration ratios.

To characterize the extent of ordering in the samples the optical diffraction produced by close-packed arrays of colloid particles obtained under oscillatory motion at different acceleration ratios was measured in the reflection mode. The results of FIG. 5 show that the sample obtained under lateral vibrations at the acceleration ratio G=18 exhibits the highest intensity of the diffracted light. Also the width of this peak is narrower than the diffraction peaks measured for other samples obtained at acceleration ratios lower and higher than the optimum, indicating a more crystalline structure is obtained under this condition of horizontal oscillatory motion with G=18. In addition, the diffraction peak of the sample obtained at the optimum acceleration ratio shows a shift toward shorter wavelengths which is also an indication of the more close-packed structure.

The foregoing description of the preferred embodiments of the invention has been presented to illustrate the principles of the invention and not to limit the invention to the particular embodiments illustrated. It is intended that the scope of the invention be defined by all of the embodiments encompassed within the following claims and their equivalents.

Therefore what is claimed is:

1. A method of producing three dimensional assembly of particles in ordered arrays, comprising:

providing in an enclosure a dispersion of colloidal particles in a liquid;

inducing settling of said dispersion of colloidal particles;

applying an effective oscillatory motion to the enclosure such that said settling dispersion of colloidal particles to form a three dimensional array of particles, the oscillatory motion having a displacement A in an effective range and a frequency υ in an effective range; and removing the three dimensional array of particles from said liquid.

2. The method according to claim 1 wherein the dispersion of colloidal particles in the liquid is contained in said enclosure having a bottom on which a three dimensional array of particles is formed, and wherein applying an effective oscillatory motion includes imparting oscillatory motion lateral to a direction of settling of the particles, or imparting oscillatory motion parallel to a direction of settling of the particles, or imparting a combination of both types of motion to said enclosure.

3. The method according to claim 2 wherein the oscillatory motion applied to said enclosure has an acceleration of vibration given by $G=A\omega^2/g$, wherein g is the gravitational constant, A is said displacement, and ω is angular frequency given by ω=2πυ, and wherein G is maintained in an effective range by varying values of A within an effective range of displacements and υ within an effective range of frequencies.

4. The method according to claim 3 wherein said colloidal particles have a mean diameter in a range from about 10 nm to about $3 \times 10^{-3}$ cm.

5. The method according to claim 4 wherein ω is in a range from about 100 to about 10,000 Hz, and wherein the displacement A is in a range from about $5 \times 10^{-6}$ cm to about $25 \times 10^{-3}$ cm.

6. The method according to claim 4 wherein the effective concentration is up to about 20 weight %.

7. The method according to claim 2 including annealing said three dimensional array of particles.

8. The method according to claim 4 wherein the effective concentration is up to about 40% by weight, including simultaneously removing the liquid through the bottom of the enclosure while the oscillatory motion is applied to the enclosure.

9. The method according to claim 8 wherein the bottom of the enclosure includes a liquid permeable membrane having effective pore sizes through which the liquid but not the particles can penetrate.

10. The method according to claim 8 including annealing the three dimensional array of particles.

11. The method according to claim 9 including pressurizing the dispersion in the enclosure.

12. The method according to claim 4 wherein the colloidal particles are polymeric particles.

13. The method according to claim 12 wherein the polymeric particles are latex microspheres.

14. The method according to claim 4 wherein the colloidal particles have a composite core/shell structure.

15. The method according to claim 4 wherein the colloidal particles include inorganic constituents.

16. The method according to claim 4 wherein the colloidal particles include constituents having magnetic properties.

17. The method according to claim 4 wherein the colloidal particles include constituents having semiconducting properties.

18. The method according to claim 4 wherein the colloidal particles include constituents having dielectric properties.

19. The method according to claim 4 wherein the colloidal particles comprise electrically conductive constituents.

20. The method according to claim 4 wherein the colloidal particles includes optically sensitive constituents.

21. The method according to claim 4 wherein the liquid is water.

22. The method according to claim 3 wherein the oscillatory motion applied to the enclosure is selected from the group consisting of triangular, sinusoidal or stepwise oscillatory motion.

23. The method according to claim 21 wherein said oscillatory shear applied to said particle dispersion has G≧18.

24. The method according to claim 23 wherein for oscillatory shear applied horizontally to said particle dispersion G≧18, and for oscillatory shear applied vertically to said particle dispersion G≧25.

25. The method according to claim 3 wherein said displacement A applied to the dispersion is in a range from about five times a mean diameter of particles used in said dispersion to about fifty times the mean diameter of said particles.

26. A method of producing three dimensional assembly of particles in ordered arrays, comprising:

providing a dispersion of colloidal particles in a liquid contained in an enclosure having a bottom;

inducing settling of said particles;

applying an effective oscillatory motion to the enclosure such that said settling dispersion of colloidal particles forms a three dimensional array of particles, the oscillatory motion having a displacement A in an effective range and a frequency υ in an effective range; and simultaneously removing liquid through the bottom of the enclosure while oscillatory motion is applied to the enclosure; and removing the three dimensional array of particles from said liquid.

27. The method according to claim 26 wherein the dispersion of colloidal particles in the liquid is contained in said enclosure having a bottom on which a three dimensional array of particles is formed, and wherein applying the oscillatory motion includes imparting oscillatory motion lateral to a direction of settling of the particles, or imparting oscillatory motion parallel to a direction of settling of the particles, or imparting a combination of both types of motion to said enclosure.

28. The method according to claim 27 wherein the oscillatory motion applied to said enclosure has an acceleration of vibration given by $G=A\omega^2/g$, wherein g is the gravitational constant, A is said displacement, and ω is angular frequency given by ω=2πυ, and wherein G is maintained in an effective range by varying values of A within an effective range of displacements and υ within an effective range of frequencies.

29. The method according to claim 27 wherein the dispersion has a concentration up to about 40 weight %.

* * * * *